Feb. 29, 1944.  F. F. BLANK  2,343,133
PORTABLE CONVEYER AND LOADER
Filed Oct. 16, 1941  3 Sheets-Sheet 1

INVENTOR
FRANK F. BLANK
BY
Merrill M. Blackburn
atty.

Feb. 29, 1944.    F. F. BLANK    2,343,133
PORTABLE CONVEYER AND LOADER
Filed Oct. 16, 1941    3 Sheets-Sheet 3

INVENTOR
FRANK F. BLANK
BY
Merrill M. Blackburn
Atty.

Patented Feb. 29, 1944

2,343,133

UNITED STATES PATENT OFFICE 2,343,133

PORTABLE CONVEYER AND LOADER

Frank F. Blank, Walcott, Iowa

Application October 16, 1941, Serial No. 415,242

2 Claims. (Cl. 198—233)

The present invention pertains to improvements in portable conveyers and loaders, which term I contemplate as including structures utilized in the loading of trucks, wagons, and the like, and also portable structures which may be used for elevating not only hay, unthreshed small grain, corn on stalks, and the like, but also corn on cobs and other similar agricultural products. It will be easily understood that this construction may be readily used for the loading of baled hay upon trucks and wagons, corn on cobs into boxes or bins, and for various other comparable agricultural purposes. This construction is also used for the handling of coal, gravel, limestone products, etc.

Among the objects of this invention are the provision of a portable structure of the nature indicated which is readily adjustable to deliver elevated products of the nature indicated to different heights above the ground; to provide a structure of the nature indicated having a motor for the operation of the working parts thereof, which motor may be adjusted with relation to the supporting frame so that the motor will always have a substantially vertical position, notwithstanding changes in position of the elevating mechanism; to improve generally upon structures for the purpose indicated; and such further objects, advantages, and capabilities as will hereafter appear and as are inherent in the structures disclosed herein. My invention further resides in the combination, construction, and arrangement of parts illustrated in the accompanying drawings, and, while I have shown therein what is regarded as the preferred embodiment of this invention, together with a modification thereof, I desire the same to be understood as illustrative only and not to be interpreted in a limiting sense.

In the drawings annexed hereto and forming a part hereof,

Fig. 5 represents a side elevation of the upper part of the structure shown in Fig. 2, partly broken away, to show internal structure;

Figure 2:
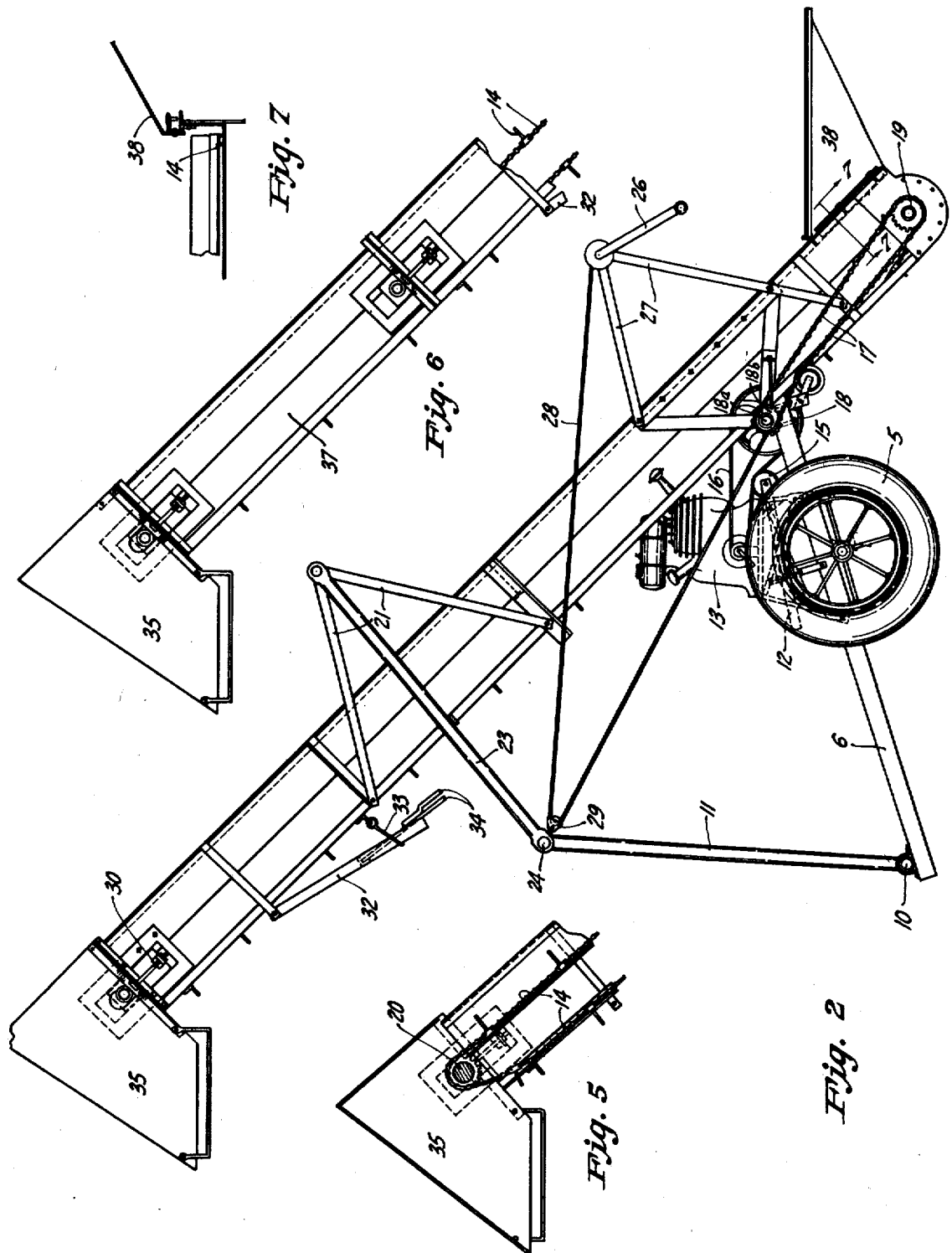
Fig. 2 represents a side elevation of a similar structure for elevating corn or the like into a wagon box or bin or for other comparable uses.

Fig. 6 represents the upper portion of the structure shown in Fig. 2 with an extension link inserted between the main body and the upper end portion whereby it is made possible to increase the height to which this structure may deliver whatever commodities it is used to elevate; and Fig. 7 represents an expanded fragmentary cross-section substantially along the plane indicated by the line 7—7, Fig. 2.

Figure 1:
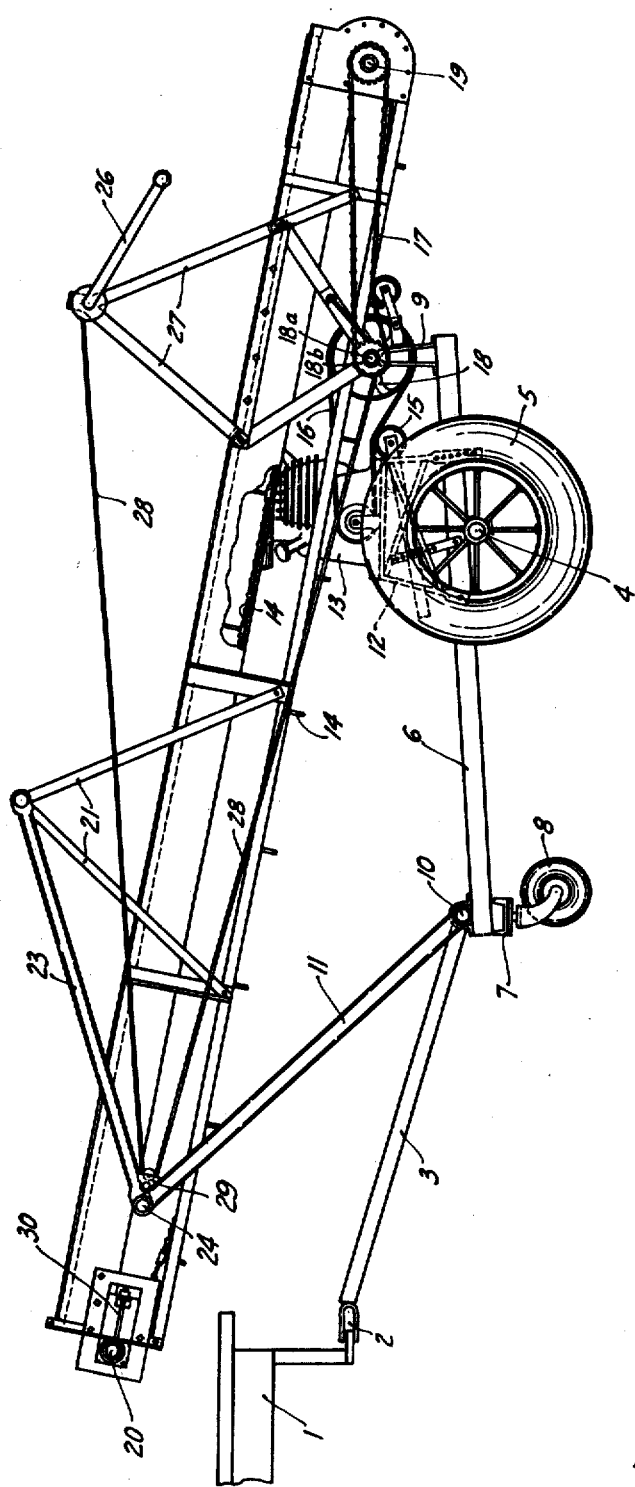
Fig. 1 represents a side elevation of one embodiment of this invention in position for elevating bales of hay to a truck.

Reference will now be made in greater detail to the annexed drawings for a more complete description of this invention. In Fig. 1, the numeral 1 indicates the rear end of a truck body to which this elevator mechanism or conveyer is to be attached for trailing in a field or elsewhere, and the numeral 2 denotes the trailer hitch by means of which the tongue 3 of the conveyer is connected to the truck. This structure is supported by an axle 4 connecting a pair of wheels 5 upon which the structure is transported. The frame members 6 connect the supporting axle 4 and a crossbar 7 to which one or more caster wheels 8 are connected. These caster wheels support the front portion of the elevator mechanism, as is obvious from Fig. 1.

From the rear ends of the frame members 6 rise posts 9 by means of which the rear portion of the elevator mechanism is supported on the rear ends of the frame members 6. Connecting the forward ends of the frame members 6 is a shaft or bar 10 to which are pivotally connected links 11.

A frame 12, pivoted at its front end to the frame 6 and adjustable at its rear with relation to this frame, supports the motor 13 by means of which the carrier mechanism 14 is operated. The pivotal adjustability just mentioned makes it possible to maintain the motor in upright position, whether the conveyer is in the horizontal position shown in Fig. 3 or in the inclined position shown in Fig. 4 or in any intermediate position. A pulley 15 is adjustable to vary the tension of the belt 16 and take up any slack therein. This keeps the belt from jumping off from the pulleys. It may also serve as a clutch. A sprocket chain 17 is driven by the pulley 18 and in turn drives the shaft 19 which causes operation of the conveyer belt 14, the pulley 18 being mounted on the shaft 18a. The conveyer belt 14 runs around a shaft 20 at the opposite end of the elevator. It is also clear that the drive belt or chain may go from a pulley or sprocket wheel 18b on shaft 18a to a pulley or sprocket on the shaft 20 to drive the belt 14 at its upper end.

On the opposite sides of the elevator are pairs of bars 21 which are secured to the elevator and to each other to form a triangular frame, and these two frames are connected by a cross-shaft 22 to which are connected links 23, the second ends of which are connected at 24 to the links 11. A shaft 25, rotated by a crank 26, is mounted in frames 27, comparable to the frames formed by the bars 21. Cables 28 run from the shaft 25 to pulleys 29 upon opposite sides of the elevator, said pulleys being connected to the joints between the links 11 and 23, indicated at 24. From these pulleys 29, the cables run rearwardly and are connected adjacent the rear end of the supporting frame.

From the foregoing it will be seen that when the crank 26 is turned, the cables 28 will be wound up on the shaft 25, and this will cause the straightening of the joints between the links 11 and 23. This causes elevation of the forward end of the elevator so that the height of the forward end thereof may be adjusted as desired within the limits of adjustment provided by the mechanism. It is obvious that turning the crank 26 in the opposite direction will allow the elevator to be lowered. Adjusting means 30 is provided upon opposite sides of the elevator for adjusting the tension of the conveyer belt 14.

Figure 3:
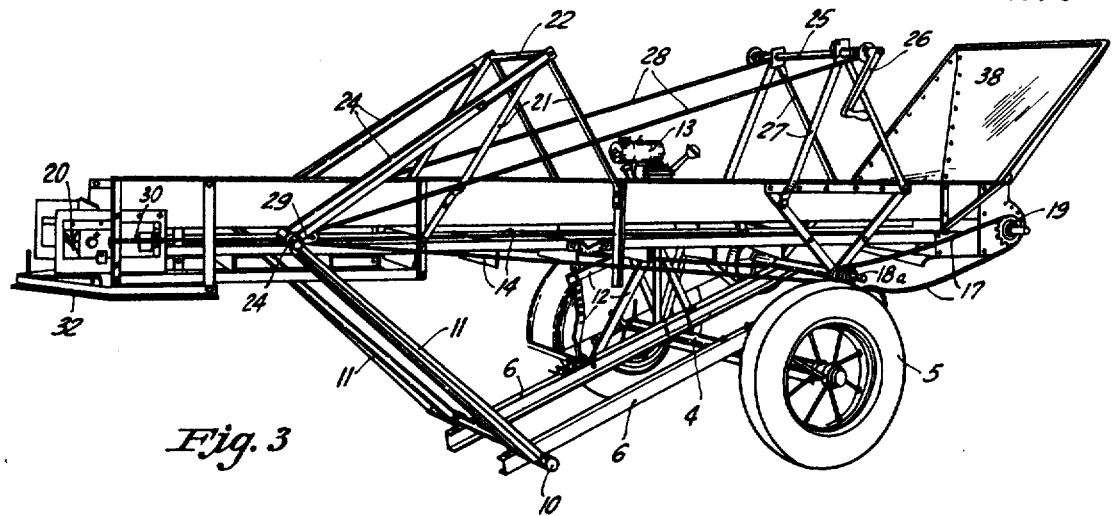
Fig. 3 represents a perspective view of the structure shown in Fig. 2 in a position to be hitched to a towing instrumentality, such as a wagon, truck, or tractor.
Figure 4:
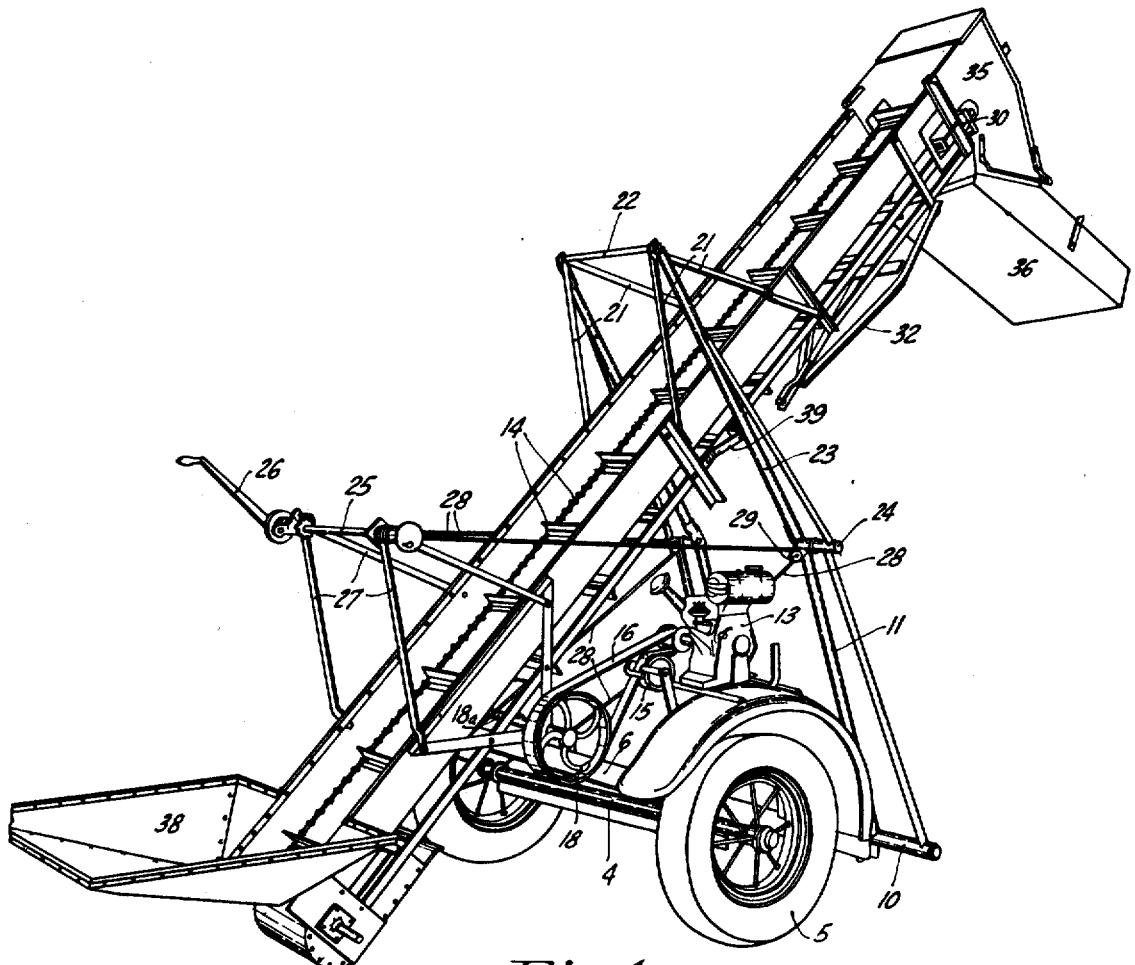
Fig. 4 represents a perspective view of the structure shown in Fig. 3, the same being completely raised for the elevation of a commodity.

In Figs. 2, 3, and 4 there is shown a hinged tongue 32 which is pivotally connected to the upper end portion of the elevator. As shown in Fig. 2, this may be held up out of the way by a hook or hooks 33 when it is not needed. At its forward end, this tongue 32 is provided with connecting means 34 by which it may be connected to a tractor for conveyance from place to place. A hood 35 may be provided at the upper end of the elevator for directing downwardly corn or other more or less fragmentary materials and, as shown in Fig. 4, a chute 36 may be attached to the hood 35 for delivering such materials laterally, as when delivering corn through the roof of a corn crib into a bin therein.

As shown in Fig. 6, an extension piece 37 may be inserted between the hood 35 and the main body of the elevator to increase the height to which materials may be carried. When this apparatus is being used for delivering bales to a truck rack, the hood 35 is removed so that it will not interfere with the delivery of the bales. A structure in accordance with this invention, when being used for the handling of fragmentary materials, as corn, is provided with a hopper 38 into which such materials may be shoveled or may be allowed to run from a bin or other receptacle and from which the materials are conveyed by the conveyer belt 14.

Let us assume that we have hitched the member 32 to a truck or the like, when getting ready to move this apparatus from one place to another. (See Fig. 3.) The crank 26 will now be turned to permit the joint between the links 11 and 23 to fold more than shown in this figure. This will take place because the major portion of the weight of the apparatus is on the rear end of the frame member 6, pressing downwardly thereon. This raises the front ends of these members when they are freed for such motion by the decrease of the angle between the links 11 and 23. In this way, the rear ends of the frame members 6 are lowered and the front ends are raised, thus clearing the apparatus for transport from one position to another.

Let us now assume that we have reached the place where it is desired to set this apparatus up for use, as shown in Fig. 4. The crank 26 is now turned to wind the cables 28 on the shaft 25. This tends to straighten the joints between the links 11 and 23, thus forcing the forward ends of the frame members 6 downwardly. This results in raising the rear ends thereof. When the front ends of these members have contacted the ground, the winding may be stopped and the drawbar or tongue disconnected from the tractor element. Now, by continued turning of the shaft 25, the angle between links 11 and 23 is straightened more, with the result that eventually the parts assume the position shown in Fig. 4, when further motion of the links 23 is stopped by the stop member 29. The apparatus is now supported by the wheels 5 and the forward ends of the frame members 6, and is now in position for use, and the engine 13 may be started for the purpose of driving the conveyer belt. The primary purpose of the caster wheels 8 is to serve as supporting means for the front ends of the frame members 6.

It will of course be understood that the specific description of structure set forth above may be departed from without departing from the spirit of this invention as set forth in this specification and the appended claims.

Having now described my invention, I claim:

1. An elevator of the type described comprising, in combination, a pair of wheels, an axle connecting them, supporting means resting on said axle and connected thereto at a point unequally spaced from the ends of the supporting means, a support for a conveying belt pivotally connected to the short end of said supporting means at a point near one end of the support whereby to permit the support for the conveying belt to be tilted so as to make an angle of approximately forty-five degrees (45°) to the surface of the earth with the lower end of said conveyer belt supported close to the ground, a toggle-link connecting the second end of said supporting means to the mid-portion of the conveying belt support and serving when actuated to push the long end of said supporting means down whereby to elevate the other end thereof and simultaneously raising the upper end of the conveying belt support, and actuating means for the toggle-link whereby it may be straightened so as to increase the angle between the conveying belt support and the surface of the ground.

2. In a portable conveyer of the type indicated having traversing wheels, an axle connecting them, and a frame supported and tiltable on the axle with its ends unequally spaced from the axle; the combination of a conveyer unit pivotally connected to the short end of said frame adjacent the end thereof, a receiving hopper connected to an end of said conveyer unit to receive material such as grain or gravel and deliver same to the conveyer unit, foldable linkage means to depress the second end of said frame and elevate the second end of said conveyer unit, and actuating means for controlling the folding and unfolding of said foldable linkage, the conveyer unit being so constructed and arranged that the lower end thereof will be closely adjacent the ground when the unit is in elevating position.

FRANK F. BLANK.